United States Patent [19]
Curry

[11] Patent Number: 5,638,048
[45] Date of Patent: Jun. 10, 1997

[54] ALARM SYSTEM FOR SWIMMING POOLS

[76] Inventor: Robert C. Curry, 10,000 Wilson Ave., Seminole, Fla. 34646

[21] Appl. No.: 385,602

[22] Filed: Feb. 9, 1995

[51] Int. Cl.⁶ .................................................. G08B 13/18
[52] U.S. Cl. .................. 340/552; 340/573; 340/522; 367/93; 367/94
[58] Field of Search .................. 340/573, 522, 340/552, 553, 554; 367/93, 94

[56] References Cited

U.S. PATENT DOCUMENTS

| | | | |
|---|---|---|---|
| 2,783,459 | 2/1957 | Lienau et al. | 367/93 |
| 3,209,313 | 9/1965 | Auer, Jr. et al. | 367/93 |
| 3,513,463 | 5/1970 | Stevenson, Jr. et al. | 367/93 |
| 3,597,754 | 8/1971 | Lerner | 367/93 |
| 3,681,745 | 8/1972 | Perlman et al. | 367/94 |
| 3,740,704 | 6/1973 | Suter | 367/94 |
| 3,781,772 | 12/1973 | Inoue et al. | 367/93 |
| 3,801,978 | 4/1974 | Gershberg et al. | 340/522 |
| 3,805,224 | 4/1974 | Wenz | 367/93 |
| 3,815,131 | 6/1974 | Dautel et al. | 340/544 |
| 3,846,778 | 11/1974 | Galvin et al. | 367/94 |
| 3,922,660 | 11/1975 | Galvin | 340/522 |
| 4,097,835 | 6/1978 | Green | 367/94 |
| 4,114,146 | 9/1978 | Inoue et al. | 367/93 |
| 4,142,187 | 2/1979 | Nakayama | 367/94 |
| 4,288,867 | 9/1981 | Guthart | 367/93 |
| 4,349,897 | 9/1982 | Boehme et al. | 367/98 |
| 4,541,080 | 9/1985 | Kodaira | 367/94 |
| 4,570,247 | 2/1986 | Walker et al. | 367/93 |
| 4,845,685 | 7/1989 | Wechsler et al. | 367/97 |
| 5,029,147 | 7/1991 | Andrews et al. | 367/134 |
| 5,043,705 | 8/1991 | Rooz et al. | 340/573 |
| 5,049,859 | 9/1991 | Arnell | 340/573 |
| 5,170,791 | 12/1992 | Boos et al. | 128/661.07 |
| 5,177,691 | 1/1993 | Wells et al. | 364/485 |
| 5,274,807 | 12/1993 | Bean | 367/98 |
| 5,369,623 | 11/1994 | Zerangue | 340/573 |
| 5,396,217 | 3/1995 | Proefke et al. | 367/93 |
| 5,414,675 | 5/1995 | Geohegan, Jr. | 367/93 |

*Primary Examiner*—Jeffery Hofsass
*Assistant Examiner*—Benjamin C. Lee
*Attorney, Agent, or Firm*—Joseph C. Mason, Jr.; Mason & Associates, PA

[57] ABSTRACT

A sonar, lidar, or radar system generates an alarm signal if a child enters a swimming pool when the system is enabled, and includes multiple safeguards against sounding false alarms due to wind-activated waves in the pool or self interference arising from multi-path propagation of the sonar signals. An acoustic or electromagnetic receiver having a narrow bandwidth is employed to demodulate a composite signal spectrum produced by a target object such as a child and signals generated by wind-activated waves. It also performs an envelope amplitude monitoring function to suppress false alarms that might be generated by low amplitude envelopes of the type created by self interference. In a first embodiment, an alarm signal is generated only if the demodulating function and the envelope amplitude monitoring functions both indicate a legitimate alarm. In additional embodiments, still further redundancies are added to further decrease the probability of a false alarm, but none of the redundancies reduces the probability of recognizing legitimate signals.

12 Claims, 4 Drawing Sheets

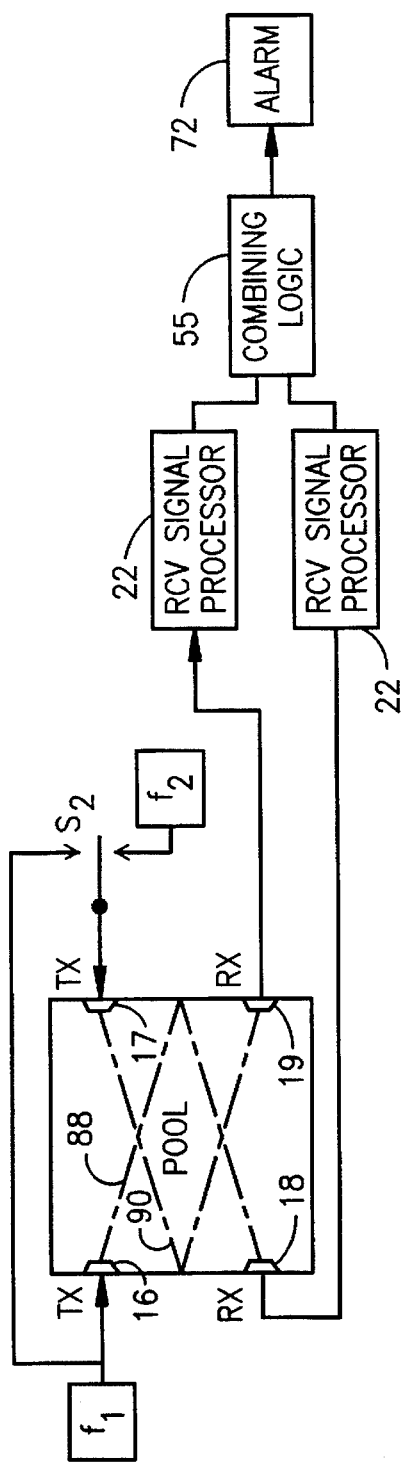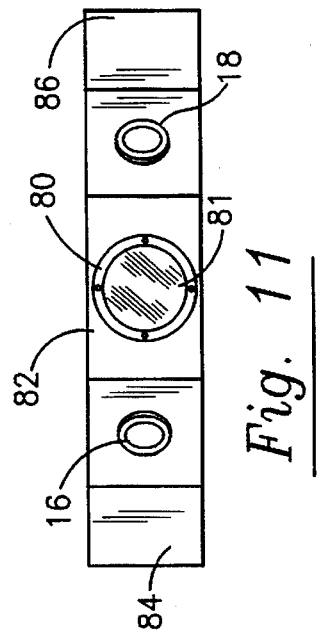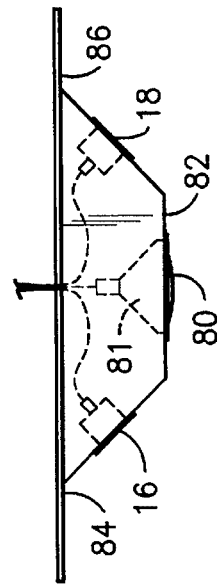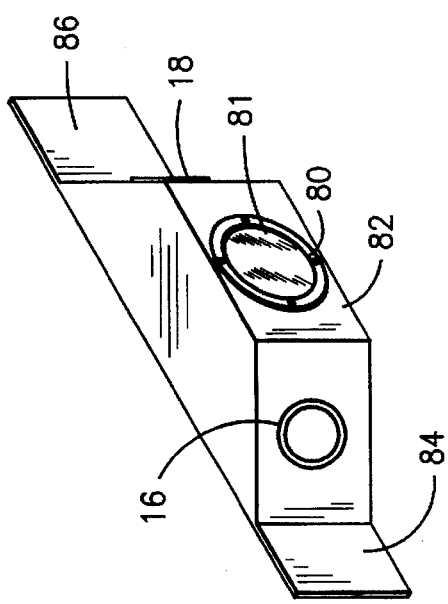
Fig. 9
Fig. 11
Fig. 12
Fig. 10

5,638,048

ALARM SYSTEM FOR SWIMMING POOLS

BACKGROUND OF THE INVENTION

1. Field of the Invention

This invention relates, generally, to safety devices. More particularly, it relates to a safety device that sounds an alarm when an object enters into a swimming pool at an unexpected time.

2. Description of the Prior Art

Many inventors have developed alarm means that are sounded when a child falls into a swimming pool at an unexpected time, i.e., when the alarm means is armed. Examples of patents on such devices include U.S. Pat. Nos. 5,177,691 to Welles et. al., 5,049,859 to Arnell, and 4,349,897 to Boehme et. al.

Some of these earlier devices incorporate sonar technology. As is well known, a sonar, lidar, or radar device transmits an ultrasonic or electromagnetic signal under water and analyzes the characteristics of the signals that return to the source after having been reflected back to the source by a target object. In a swimming pool setting, such a device is calibrated when the pool is empty and the wind is not blowing. The resulting reflected signals become the reference signals against which all other signals are compared. Thus, if a reflected signal returns to its source earlier than expected, it is presumed that it reflected off a foreign object and an alarm signal is generated and transmitted to an alarm device. Moreover, if a signal is received at a different frequency or out of phase with its original frequency or phase, reflection off a moving foreign object is presumed an alarm signal is generated.

More specifically, when an object such as a child falls or otherwise enters into a pool equipped with a sonar, lidar, or radar device, the frequency of the return signal is changed by the Doppler effect, thereby causing the device to generate an alarm signal. An ultrasonic or electromagnetic wave bouncing off such a foreign object will also return to the receive device at an earlier time than it would have but for the presence of the foreign object which shortened its path of travel around the pool.

The two primary sources of false alarms are wave action caused by wind, and self interference resulting from multi-path propagation.

Unfortunately, wind-activated wave action also causes the molecules of water in the pool to move toward or away from the receive device, thereby creating a Doppler effect and triggering the alarm.

As mentioned earlier, self interference is a problem, i.e., reflected waves often form interference patterns and cancel out each other; moreover, wave action alters the interference patterns. The receiving device compares the returning ultrasonic or electromagnetic waves with the reference ultrasonic or electromagnetic waves, notes that some of the returning waves are missing, as if absorbed by a target object, and activates an alarm.

After a pool owner has been repeatedly summoned to a pool just because the wind is blowing, or because an interference pattern has formed, he or she learns to ignore the alarm. Many people simply disconnect the alarm system after being summoned to the pool by numerous false alarms.

Accordingly, there is a need for a system that is not subject to false activation by wind-driven waves and by self interference.

However, at the time the present invention was made, it was not obvious to those of ordinary skill in this art how a system not subject to false activation could be developed.

SUMMARY OF THE INVENTION

The longstanding but heretofore unfulfilled need for a swimming pool safety alarm not subject to false activation is now fulfilled. The novel system combines the technology of Doppler sonar, lidar, or radar with phase locked tracking; it eliminates errors caused by wind-generated waves and employs an envelope monitor to eliminate false alarms caused by variable multipath propagation.

More particularly, the novel system for detecting the presence of a foreign object in an enclosed body of water includes a transmitter disposed beneath the surface of the water for transmitting ultrasonic or electromagnetic waves, a similarly immersed receiver for receiving ultrasonic or electromagnetic waves that have reflected off boundary walls of the enclosed body of water or off a foreign object in said body of water, first false alarm inhibiting means for suppressing alarm signals caused by wind-generated waves, and second false alarm inhibiting means for suppressing alarm signals caused by variable self interference.

The first false alarm inhibiting means including a demodulating means for extracting a spectrum of a foreign object from a composite spectrum of the foreign object and wind-generated waves, said demodulating means including a phase lock loop means included within said receiver, and said receiver having a narrow bandwidth, so that the wave-modulated carrier extracted by said demodulating means demodulates said broader composite spectrum.

The second false alarm inhibiting means operates on the principle that loss of signal at the receiver of the type caused by self interference arising from multi-path propagation is characterized by a pronounced decrease in amplitude of the envelope of the reflected signal. If the envelope amplitude falls to zero or another very low value, such total or near total loss of signal is attributed to self interference. Thus, the present invention includes means for suppressing an alarm signal when envelope amplitude drops to zero or nearly zero. Specifically, the novel means includes a monitoring means for monitoring the amplitude of an envelope of a reflected signal, threshold detecting means for determining when said envelope amplitude falls below a predetermined value, and means for suppressing an alarm signal when said threshold detecting means detects an envelope having an amplitude below said threshold.

The novel method for detecting a foreign object in an enclosed body of water includes the steps of transmitting ultrasonic or electromagnetic waves from a point in said enclosed body of water at a predetermined depth below the surface thereof, receiving said waves that have reflected off boundary walls of said enclosed body of water or off a foreign object in said body of water, phase locking onto said reflected waves, extracting a spectrum of a foreign object from a composite spectrum of said foreign object and wind-generated waves with a phase lock loop receiver having a narrow bandwidth, so that a wave-modulated carrier extracted by said receiver means demodulates said composite spectrum and thereby distinguishes data indicating the presence of a target object from data indicating the presence of wind-generated waves, monitoring the amplitude of an envelope of a reflected signal, determining when said envelope amplitude falls below a predetermined value, and suppressing an alarm signal when an envelope having an amplitude below said threshold is detected.

Additional safety features include the combination of redundant safety features to provide further assurance against false alarms without decreasing the detection of legitimate alarm signals.

It is therefore understood that the primary object of this invention is to advance the art of pool safety devices and methods by introducing novel means and methods for minimizing false alarms without sacrificing detection of legitimate alarms.

A closely related object is to provide effective means for recognizing and suppressing false signals arising from wind-generated wave action and self interference arising from multi-path propagation.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 9 is a diagrammatic depiction of a redundant system having two transmitters and two receivers providing both frequency and space diversity;

FIG. 10 is a perspective view of a novel mounting means for an existing pool light and the transmitter and receiver of this invention;

FIG. 11 is a front elevational view of the mounting means of FIG. 10; and

FIG. 12 is a top plan view thereof.

DETAILED DESCRIPTION OF THE PREFERRED EMBODIMENT

Figure 1:
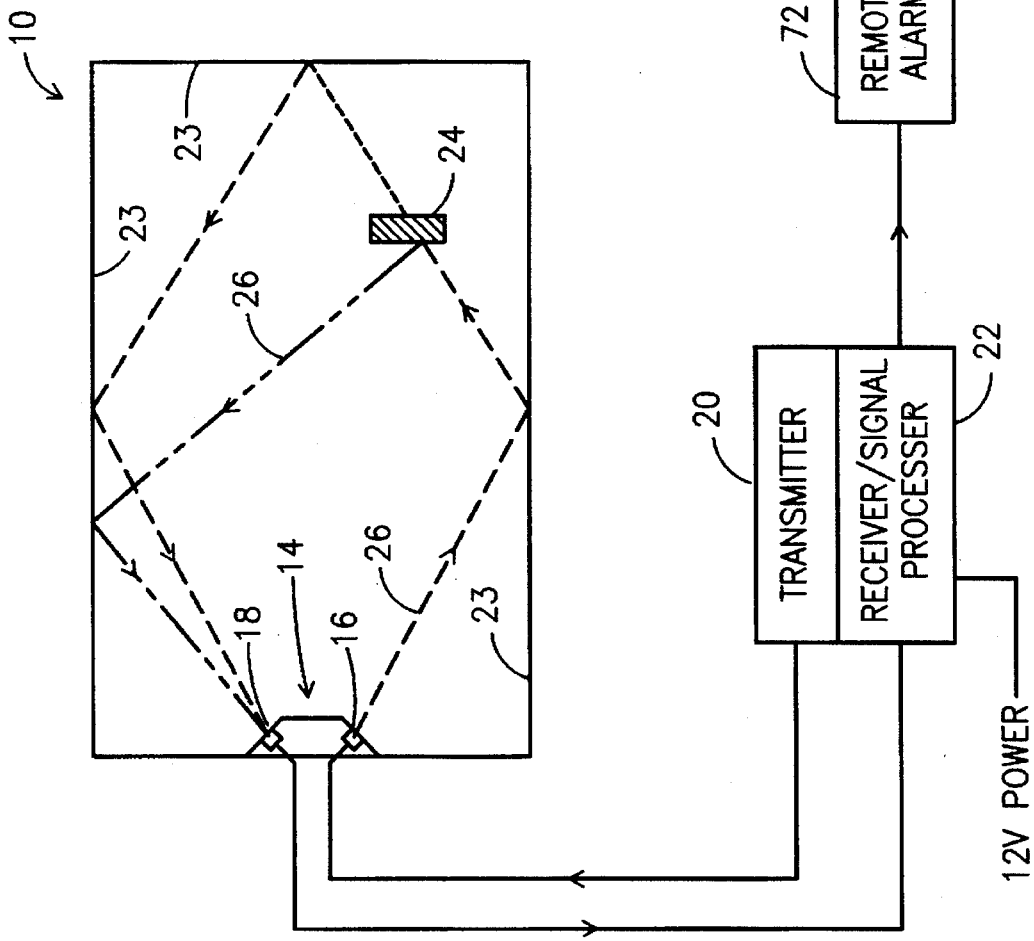
FIG. 1 is a plan view of a swimming pool showing the inventive structure in diagrammatic form.

Referring now to FIG. 1, it will there be seen that an illustrative embodiment of the invention and an illustrative environment within which the invention has utility are denoted as a whole by the reference numeral 10.

A transducer means 14 is mounted a predetermined distance beneath the water surface of rectangular swimming pool 12 to minimize interference caused by wind-generated surface waves. Transducer 14 includes a transmitting transducer 16 and a receiving transducer 18. Transmitting transducer 16 is in electrical communication with transmitter 20 and receiving transducer 18 is in electrical communication with Receive Signal Processor 22; units 20 and 22 are provided in a single package, as illustrated. Low voltage power (about twelve volts) is delivered to units 20 and 22 to operate the novel system. The transducer 14 converts electrical energy to ultrasonic or electromagnetic energy. Specifically, transmitter transducer 16 converts electrical energy from transmitter 20 to ultrasonic or electromagnetic energy, and receiving transducer 18 converts ultrasonic or electromagnetic energy into electrical energy for analysis by Receive Signal Processor 22.

Although signals emanating from transducer 16 will follow many paths about the perimeter of the pool (causing loss of signal arising from self-interference from time to time as aforesaid), a single path 20 is shown in FIG. 1 for explanation purposes. Note that ultrasonic or electromagnetic signals following path 20 bounce off three sidewalls 23 of pool 12 before being picked up by receiving transducer 18. If these signals encounter an object 24, they follow a different path 26 when returning to receiver transducer 18. Note that path 26 has less extent than path 20; thus, signals bouncing off object 24 will arrive at transducer receiver 18 prior to the arrival of those signals that followed path 20. Path 20 is a reference path, i.e., transducer 14 is calibrated when the pool is known to be empty of objects and free of physical waves. Thus, when signals are received at a time earlier than expected, such early-arriving signals indicate the presence of an object in the pool.

Moreover, since the foreign object 24 is likely to be moving, the frequency of the signals that follow path 26 will be shifted from the frequency of the reference signals due to the Doppler effect. Thus, receiver 18 is supplied with two independent items of information indicating the presence of foreign object 24, i.e., the time differential and the frequency shift. In either or both events, the Receive Signal Processor 22 senses the changes and generates a signal to activate one or more alarms.

In an alternative embodiment of the FIG. 1 system, a single transducer is employed, and appropriate control means are provided to switch the transducer from a transmitting mode to a receiving mode.

If a pool is in a fully enclosed area not subject to wind disturbance, a simple FM discriminator could be employed to detect the Doppler shift created by a foreign object falling into a pool or false alarms caused by waves. However, such a device would not solve the false alarm problem caused by self-interference resulting from multipath propagation.

Figure 2:
FIG. 2 is a spectrum of the wave energy detectable by a phase loop lock receiver having a narrow bandwidth.
Figure 3:
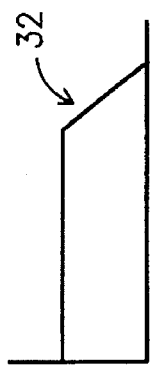
FIG. 3 is a composite spectrum of the wave energy of FIG. 2 and a target.
Figure 4:
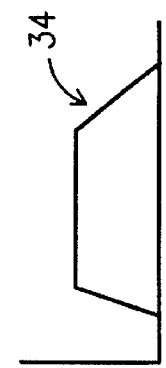
FIG. 4 is a demodulated spectrum of the target.

However, few private homes include indoor pools, so false alarms created by wind-activated waves must be dealt with. This invention eliminates wind-related false alarms in a unique, heretofore unknown way. As is well-known, when two signal frequencies are mixed, they form sum and difference frequencies. The sum frequencies may be filtered out, leaving only the difference frequencies; a first part of this invention is based upon the insight that said difference frequencies include the demodulated Doppler output signal due to the waves which can therefore be used to demodulate the wider bandwidth signal created by a foreign object if receiver 22 has a narrow bandwidth. In other words, a receiver 22 having a relatively narrow bandwidth will extract a carrier which may then be used to demodulate the wider bandwidth signal associated with the target. More particularly, as depicted in FIG. 2, the wave energy within the bandwidth of Receive Signal Processor 22 is denoted 30. The composite spectrum of the wind-activated waves and the waves reflected from a foreign object in the pool is denoted 32 in FIG. 3. Using the wave-modulated carrier of FIG. 2 to demodulate the signal of FIG. 3 produces the demodulated spectrum 34 of the foreign object, as depicted in FIG. 4. This enables Receive Signal Processor 22 to make a positive identification of a foreign object. Prior art devices, on the other hand, would identify the composite spectrum 32 of FIG. 3 as being a foreign object; heavy wind-activated wave action could produce a large signal, thereby producing a false alarm. As demodulated by receiver 22, the spectrum of FIG. 4 no longer contains a wave spectrum as in FIG. 2 and thus an alarm activated upon reception of a FIG. 4 type of spectrum will not be a false alarm.

Receiver 22 is enabled to perform this function by modifying a conventional sonar, lidar, or radar receiver so that it includes a phase lock loop means. Accordingly, the receiver phase locks to the received signal and tracks the varying time error caused by wind-activated waves. This phase detector serves as the demodulator in the manner described above. The phase lock circuitry is disclosed hereinafter.

The aforesaid demodulation procedure does not prevent false alarms arising from the presence of interference patterns that cancel reflected signals, i.e., it has no effect on self-interference arising from variable multi-path propagation. The novel means for overcoming such false alarms includes means for monitoring the amplitude of the envelope of the received signal; if the amplitude of the envelope falls below a predetermined threshold, multipath interference is presumed and activation of the alarm signal is suppressed. Thus, a signal having an envelope with an amplitude above the predetermined threshold is presumed to have been formed by the concurrence of a detected Doppler signal and the presence of a carrier signal having an amplitude equal to or greater than said predetermined minimum threshold, i.e., such a signal is presumed to indicate the presence of a foreign object in the pool and not just the presence of interference.

Figure 5:
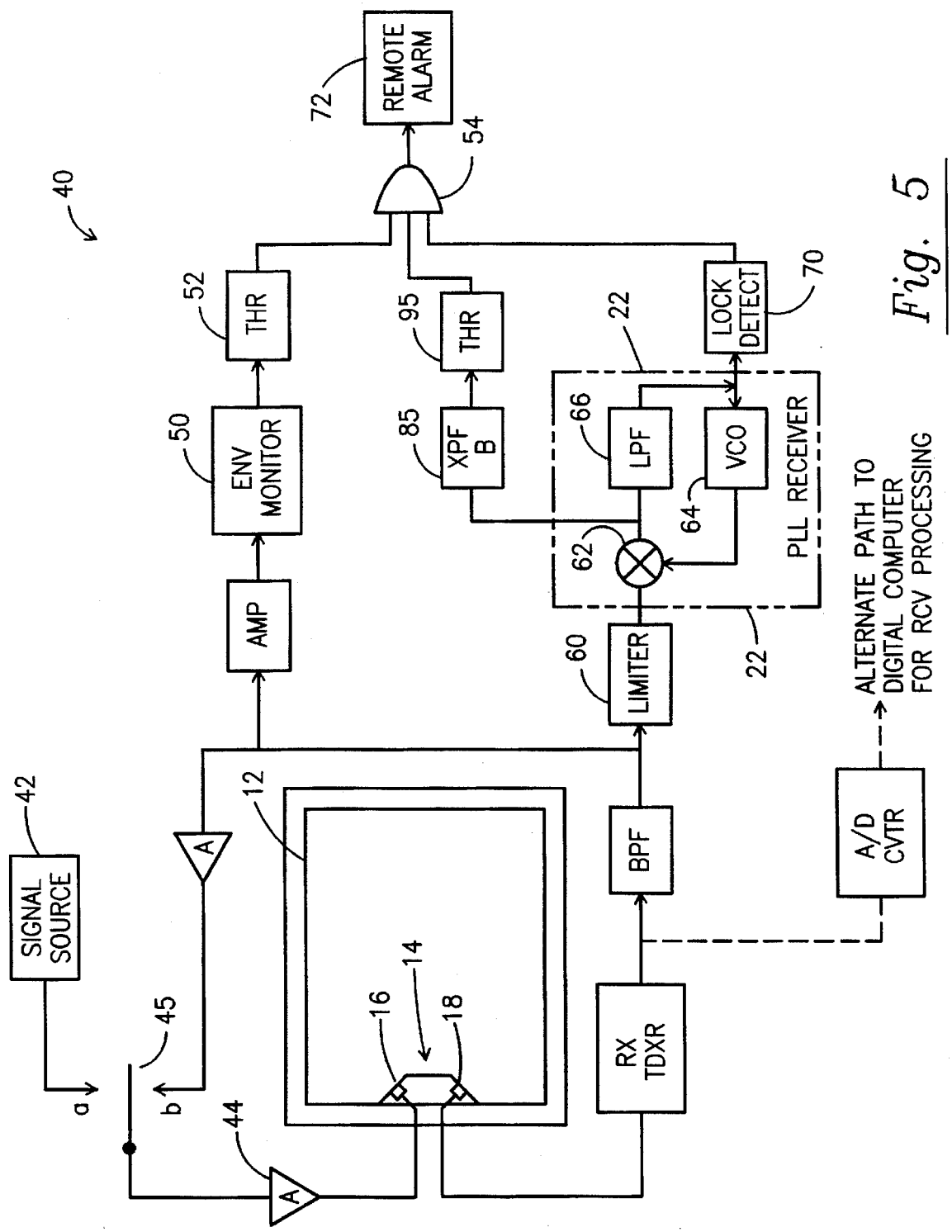
FIG. 5 is a diagrammatic depiction of a first embodiment of the novel circuitry.

The circuitry including the above-mentioned demodulating means and envelope monitoring means is depicted in FIG. 5 and is denoted 40 as a whole.

Circuit 40 includes signal source 42, a continuous or pulsed oscillator or other complex signal source which forms a part of transmitter 20; it typically oscillates at the resonance frequency of transmitting transducer 16 to provide maximum energy transfer. Amplifier 44 amplifies the output of signal source 42 to provide power sufficient to drive transducer 16. Amplifier 44 also provides a reactive source impedance that resonates with the impedance of the transducer to provide maximum energy transfer.

The signal received at receive transducer 18 is delivered to envelope monitor 50 that performs the function expressed by its name. Threshold detector 52 then determines whether or not the amplitude has exceeded a minimum threshold. If it has, a legitimate signal is presumed because self-interference generally causes a very low envelope amplitude, i.e., the threshold detector 52 screens out such drastic drops in envelope amplitude and therefore generates a "signal present" signal when the envelope amplitude is above the predetermined threshold. Note that the "signal present" signal generated by detector 52 is sent to an input of multi-input AND gate 54. Accordingly, the presence of an apparently legitimate alarm signal is not sufficient to activate the AND gate. This is because the apparently legitimate alarm signal may be caused by wind-activated waves; the balance of the circuitry 40 is dedicated to detection of signals arising from such wind-activated waves and removal of said signals so that true target signals may be analyzed. If an apparently true target signal is detected by the balance of the circuitry, a signal is sent to another input of said AND gate. Thus, there must be a concurrence of signals from the envelope-monitoring part of the circuitry and the demodulating part thereof.

In the demodulating section of the circuitry, the signal from receive transducer 18 is delivered to hard limiter 60 which performs the function of removing amplitude variations in the received signal, and the output of limiter 60 is delivered to Receive Signal Processor 22 which includes a phase locked loop which locks in phase to the incoming signal and tracks its phase with a narrow bandwidth (approximately 1 to 5 Hz) loop specifically selected to track the motion of the waves.

More particularly, the output of limiter 60 is fed to phase detector 62 which continually compares the phase of the signal received from limiter 60 with the signal received from voltage controlled oscillator 64. The detected phase error is fed to loop filter and amplifier 66 and the filtered and amplified signal is fed back to VCO 64 as shown. Thus, the detected phase error is used to adjust the phase of the VCO, thereby keeping the VCO locked onto the incoming signal. Accordingly, at the output of phase detector 62, the signal due to wind-activated waves has been extracted and used to demodulate the remaining wide-band signal associated with the foreign object.

Part of the output of phase detector 62 is fed back to VCO 64 as aforesaid, and lock detector 70, and part is fed to filter 85 and threshold detection circuit 95. The function of Lock Detector 70 is to verify that the phase locked receiver is in the LOCK state, i.e., that it is locked in phase to the received signal. Without this function, the phase locked receiver may provide an incorrect signal indicating a detection when, in fact, there is none. When a phase locked receiver is locked, there is no frequency error between the received signal and the local VCO signal, but there is a small phase error; the error voltage at the output of the phase detector is a small, slowly varying D.C. voltage. When a phase locked receiver starts to operate, there is a period of time, called the acquisition time, during which the receiver is trying to find the incoming signal. During this time, there is a frequency and phase error between the incoming signal and the local VCO signal, and the output of the phase detector is a large quasi-sinusoidal signal. To prevent this large signal from appearing to be a valid detection, lock detector 70 is used to indicate when the receiver is locked and that the output signal is valid. If the amplitude of the detected signal exceeds the predetermined limit, as determined by threshold detector 95, a signal is sent to an input of AND gate 54. If the other two inputs are activated, alarm 72 is activated. Thus, detection of an apparently legitimate alarm signal after removal of wind-generated false signals is insufficient to trigger an alarm.

The other two inputs of AND gate 54 are electrically connected to the envelope monitor 50 and threshold detector 52 as mentioned earlier, and lock detector 70.

At any point in the receive processing, starting after the receive transducer, the received signal may be input to an analog-to-digital converter so that all subsequent signal processing may be performed by a digital computer means.

Although the above-identified system will eliminate most false alarms, and thus represents a significant advancement in the art, this invention includes additional embodiments as discussed below.

The basic system described herein utilizes phased locked tracking and demodulation of a continuous wave (CW) transmitted signal.

Several variations of this basic system will now be disclosed, some of which will give greater freedom from false alarms or superior detection performance. They fall into two broad categories:

A. Fewer false alarms through the use of redundant receive processing to combat propagation anomalies. Examples are:
frequency diversity
space diversity
time/phase diversity Systems using these (Group A) techniques are illustrated in FIGS. 6 through 9.

B. Improved detection through use of more complex transmit signals, such as:
pulsed CW
multi-frequency (pulsed or CW)
digital word, such as a pseudo random code
digital word modulated onto a CW or pulsed carrier These systems are embodied in block diagrams similar to that of the preferred embodiment. Only the type of signal is changed.

Finally, there is another mode called the self-excited mode, wherein the signal from the receive transducer is fed back to the transmit transducer, thereafter being transmitted through the water, received and recirculated; thus, no external signal source is required. This mode also provides enhanced sensitivity to intrusive objects. This mode is obtained when switch 45 in FIG. 5 is placed in position b.

Figure 6:
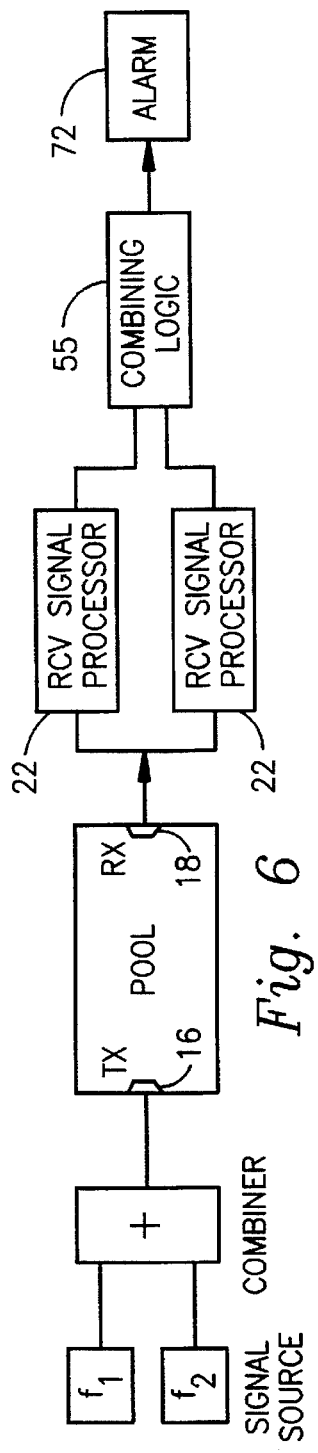
FIG. 6 is a diagrammatic depiction of a second embodiment of the novel circuitry, using frequency diversity.

In the first of the additional systems, shown in FIG. 6, multiple carrier signals are simultaneously transmitted at different frequencies $f_1$ and $f_2$. In practice, only two carrier signals should suffice. Since such signals have different wavelengths, the probability that both of them will simultaneously create a self-interfering interference pattern of the type that can trigger a false alarm is virtually zero. Receive signal processing, including envelope detection is performed on each signal independently, and the respective outputs of the receivers are fed into a combining logic means 55. The combining logic could take several forms. For example, to provide an indication of a valid detection it might:

a. Require that both receive signal processors 22 independently declare a detection.

or, b. Require that the envelope monitors of both receive signal processors independently declare the received signal to be above the required threshold, while the phase-locked receivers of each receive signal processor independently declare the signal to be a valid detection.

Notice that the difference between a and b is the location of the combination function. In a, each receiver makes an independent decision based on a combination of three detected conditions (lock, envelope above threshold, and demodulated signal above threshold) at a specific frequency f1 (or f2 for the second receiver).

In b the combining logic makes a decision based on its observation of the concurrence of each of these conditions at both f1 and f2, i.e., before it declares a valid detection, it requires that all three of the following conditions be met.

Both f1 and f2 receivers are locked, both f1 and f2 receivers have signals above threshold, and both f1 and f2 receivers have demodulated signals above threshold. In other words, this additional technique includes two sets of complete receivers 22 including threshold detectors 52 disposed in parallel with one another as illustrated. In this way, a false alarm arising from self interference is highly unlikely.

Figure 7:
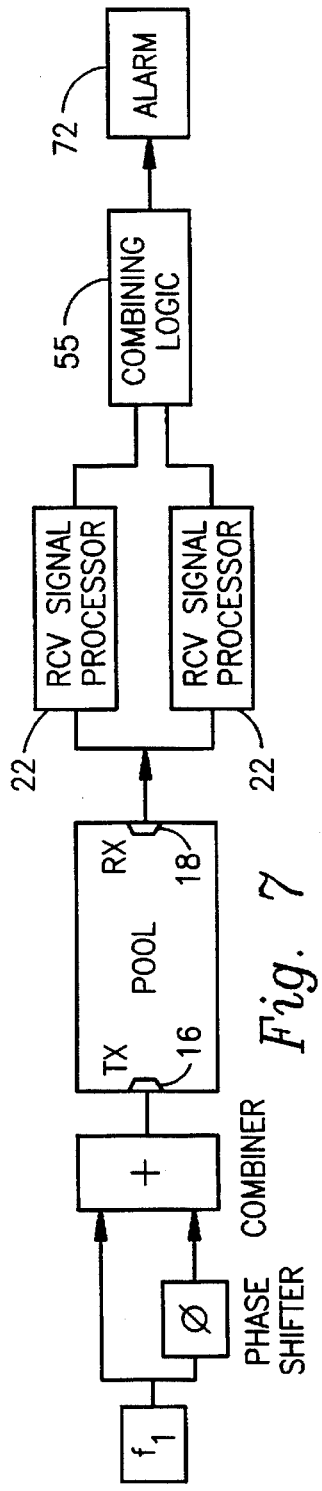
FIG. 7 is a diagrammatic depiction of a redundant phase diversity system including one transmitter and two receivers.
Figure 8:
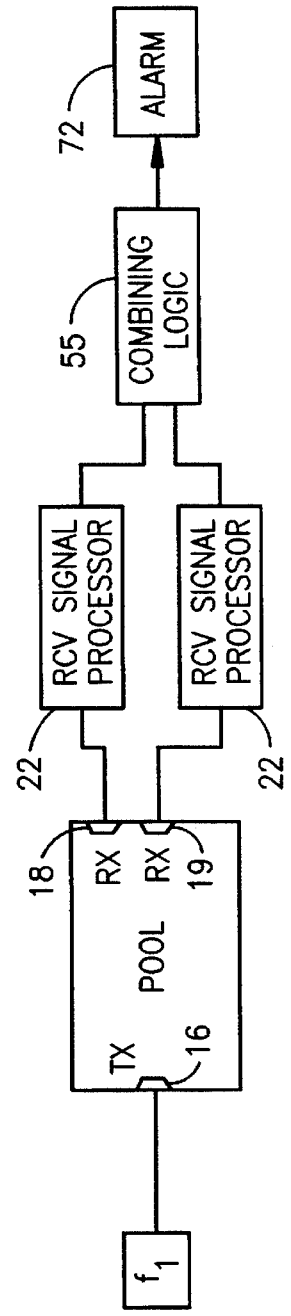
FIG. 8 is a diagrammatic depiction of a redundant system using space diversity.

The second system is similar to the first in that it relies on phase diversity instead of frequency diversity. Accordingly, it has a similar physical structure as shown in FIG. 7. It transmits two phases of a single frequency. The detection processing is essentially the same as in FIG. 6. Two or more phases of the same frequency are transmitted; if multipath conditions cause cancellation of one signal, it is highly unlikely that the other signal will also be cancelled. The same combining logic arrangement is used so that both signals are used at any particular time to provide the needed redundancy before triggering an alarm initiation. A specific case wherein the two phases are 0 degrees and 90 degrees results in the well known in-phase and quadrature (I,Q) detection system wherein the outputs of the two receivers are added, resulting in more complete detection of all components of the desired signal.

A third variation (FIG. 8) harnesses the effects of spatial diversity. Two receiver transducers 18, 19 are spaced apart from one another by a distance not equal to an integral multiple of a wavelength. Thus, the propagation distance from the transmitter to the two receivers will be different, and a loss of signal in one path due to self interference is unlikely to occur simultaneously in the other path. The above-mentioned frequency or phase diversity techniques could be used in conjunction with the spatial diversity technique to provide still another layer of invulnerability to loss of signal.

A fourth variation, which may be embodied in the apparatus depicted in FIG. 5, includes the steps of simultaneously transmitting carrier signals in pulses at a predetermined number of pulses per unit of time and generating an alarm signal if a receiver detects pulses carrying a different carrier frequency.

The final technique for guarding against loss of signal is called the forward and back technique and is depicted in FIG. 9. A first path of travel 88 is established in a first direction, such as from North to South; a second path 90 is then established in the opposite direction. Switch 52 allows for the use of a single frequency f1 or use of two frequencies, f1 and f2. Wind and self interference will affect both of these paths differently, again assuring against the probability of simultaneous self interference of wind-aided loss of signal.

The above disclosure is directed to Doppler detection means only. An improved pool safety means and method may also be provided in connection with ranging means and by redundantly combining Doppler detection methods with ranging methods to acquire still another level of assurance against false alarms without jeopardizing the recognition of legitimate alarms.

Specifically, as is well-known, sonar, lidar, and radar technology has utility in determining the range of an object. By transmitting a burst of a high frequency signal, the receiver can measure time delay to provide data for calculating range, and can measure Doppler frequency shift to provide data for calculating velocity. However, if ranging alone is used as the technique for detecting the presence of foreign objects in the pool, it will be subject to the same problems relating to Doppler receiver-based false alarms. Accordingly, an important teaching of this invention is to combine ranging and Doppler shift measurements. Thus, the probability of a false alarm is reduced still further, while still ensuring that legitimate signal losses will be recognized.

For example, the following table discloses a multidimensional set of typical detection rules which enable the making of varying estimates as to the presence of a foreign object in a pool. The heading "Doppler" refers to the. Doppler detection techniques disclosed above, and the heading "Range" refers to ranging techniques. The fractions or whole numbers refer to the amplitude of the measured signals, i.e., an amplitude of ½ indicates that the signal strength the detected signal is one-half the strength of a normal full-scale receive signal.

TABLE 1

|   | Doppler | Range | # | Alarm |
|---|---------|-------|---|-------|
| 1. | 1/2 | 1/2 | 3 | Yes |
| 2. | 0 | 2/3 | 3 | Yes |
| 3. | 2/3 | 0 | 3 | Yes |
| 4. | 2/3 | 2/3 | 2 | Yes |
| 5. | 1 | 1 | 1 | Yes |

In the first table entry, an alarm signal is generated if a Doppler detection signal having an amplitude of ½ occurs in simultaneous conjunction with a range detection of the same magnitude, and if that particular condition is repeated three successive times.

In the second, a range signal of amplitude ⅔, if repeated three successive times, will trigger an alarm even if the Doppler shift measurement is zero.

Conversely, in the third scenario, a Doppler shift of ⅔, repeated three successive times, will trigger an alarm even if the difference in range is zero.

If both measurements are ⅔ for two successive times, an alarm will be activated in accordance with the arrangement of table entry four.

The final arrangement activates an alarm if the Doppler shift and range both indicate 1 at any time.

These values are illustrative only. In the claims that follow, the amplitude of the Doppler signals is denoted X/T and the range signals are denoted Y/T to indicate that both the numerator and denominator of said amplitude signals are variable. Similarly, the number of times a particular combination is repeated is represented by "N."

In the "Forward and Back" embodiment mentioned earlier, (FIG. 9), there is a need for two transmitters and two receivers at opposite ends of the pool to establish two paths of travel for the ultrasonic or electromagnetic signals for the reasons mentioned. Similarly, in the "Time Diversity" embodiment, there is a need for a pair of receivers that are spaced apart from one another. However, in those embodiments employing a single transmitter and receiver, as depicted in FIG. 1, it is advantageous to mount the transmitter 16 and receiver 18 in the same location as the pool light. This reduces to a minimum the amount of pool space occupied by the novel equipment.

FIGS. 10–12 illustrate the preferred mounting means in the single transmitter and receiver embodiments; it accommodates transmitter 16 and receiver 18 in the same mounting fixture as the pool light to reduce to a minimum the usage of pool space. Bezel ring 80 is removed from its normal position around the periphery of pool light 81 and is repositioned on the front surface of middle section 82 of the novel mounting fixture; it holds the light and the mounting fixture in place. The original mounting holes and electrical connection for light 81 are still used, but longer screws are required as is clear from FIG. 11. Transmitter 16 and receiver 18 are mounted on sections 84 and 86, respectively.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A system for detecting the presence of a foreign object in an enclosed body of water, comprising:

a transmitter for transmitting electromagnetic waves;

a receiver for receiving electromagnetic waves that have reflected off boundary walls of said enclosed body of water or off a foreign object in said body of water;

first false alarm inhibiting means for suppressing generation of alarm signals caused by wind-generated waves;

second false alarm inhibiting means for suppressing generation of alarm signals caused by self-interference;

an alarm signal generating means;

said alarm signal generating means being activated only when said first and second false alarm inhibiting means indicate the detection of a signal not attributable to wind-generated wave action and self-interference, respectively;

said first false alarm inhibiting means including a demodulating means for extracting a spectrum due to said foreign object from a composite spectrum of said foreign object and wind-generated waves;

said demodulating means including a phase lock loop receiver having a narrow bandwidth;

whereby a modulated carrier characteristic of said spectrum due to said foreign object and derived by said phase lock loop is used by said demodulating means to demodulate said composite spectrum to extract said spectrum due to said foreign object from said composite spectrum.

2. The system of claim 1, further comprising;

said second false alarm inhibiting means including monitoring means for monitoring the amplitude of an envelope of a reflected signal;

said monitoring means including threshold detecting means for determining when said envelope amplitude falls below a predetermined value; and said second false alarm inhibiting means suppressing an alarm signal when said threshold detecting means detects an envelope having an amplitude below said predetermined threshold.

3. The system of claim 1, wherein said transmitter is adapted to transmit acoustic waves, and wherein said receiver is adapted to receive acoustic waves.

4. A method for determining the presence of a foreign object in an enclosed body of water, comprising the steps of:

transmitting electromagnetic waves from a point in said enclosed body of water at a predetermined depth below the surface thereof;

receiving electromagnetic waves that have reflected off boundary walls of said enclosed body of water or off a foreign object in said body of water to produce composite signals;

demodulating composite signals containing foreign object-related signals and wind-activated signals to remove the component thereof containing said wind-activated signals and generating a first alarm signal only if the demodulated signal contains a foreign object-related component;

monitoring the envelope amplitude of said reflected signals and generating a second alarm signal only if the amplitude of said envelope exceeds a predetermined threshold;

activating an alarm only upon the simultaneous concurrence of said first and second alarm signals.

5. The method of claim 4, wherein acoustic waves are transmitted and received.

6. The method of claim 4, wherein the step of transmitting electromagnetic waves includes the step of simultaneously transmitting multiple carrier signals at different frequencies to further reduce the probability of a false alarm signal.

7. The method of claim 4, wherein the step of transmitting electromagnetic waves includes the step of simultaneously transmitting multiple carrier signals at different phases to further reduce the probability of a false alarm signal.

8. A method for suppressing false alarms in a wave propagation-based system for detecting the presence of a foreign object in a body of water, comprising the steps of:

transmitting a carrier signal at a predetermined wavelength;

positioning at least two redundant receivers in predetermined spaced relation to one another, so that carrier signals detected by said receivers will have traveled different paths of different lengths, said predetermined spaced relation being a distance unequal to an integral multiple of the wavelength of said predetermined wavelength of said carrier signal;

suppressing generation of alarm signals caused by a loss of signal resulting from self-interference if such loss of signal is detected by one of said receivers but not the other;

generating an alarm signal only if both receivers simultaneously detect a loss of signal;

whereby the likelihood of multipath propagation causing simultaneous cancellation of said carrier signal received by said redundant receivers is remote, the use of two receivers therefore increasing the likelihood of sensing the presence of a foreign object with a high degree of reliability.

9. A method for suppressing false alarms in a wave-propagation system for detecting the presence of a foreign object in a body of water, comprising the step of:

positioning a first transmitter and a first receiver in a first spaced relation to one another;

positioning a second transmitter and a second receiver in a second spaced relation to one another;

making said first and second spaced relationships equal to one another but reversing the respective positions of said first and second transmitters and receivers so that the respective propagation paths of the respective carrier signals are in opposite directions;

suppressing generation of alarm signals caused by wind-generated waves unless both receivers simultaneously generate such alarm signals;

suppressing generation of alarm signals caused by self-interference unless both receivers simultaneously generate such alarm signals;

whereby the likelihood of wind and wave effects causing multipath cancellation of both of said carrier signals at the same time is remote so that a simultaneous cancellation of both carrier signals may be attributed to the presence of a foreign object with a high degree of reliability.

10. A method for detecting the presence of a foreign object in an enclosed body of water, comprising:

transmitting electromagnetic waves from a transmitter means;

receiving electromagnetic waves from said transmitter means that have reflected off boundary walls of said enclosed body of water or off a foreign object in said body of water;

providing a Doppler detection means including first false alarm inhibiting means for suppressing alarm signals caused by wind-generated waves;

further including as a part of said Doppler detecting means second false alarm inhibiting means for suppressing alarm signals caused by self-interference;

providing a ranging means employing pulsed transmissions of electromagnetic waves and means for measuring elapsed time between said pulsed transmissions and reception of echoes resulting therefrom to determine the distance between a source of said pulsed transmissions and a foreign object causing said echoes;

providing an alarm signal generating means;

activating said alarm signal generating means only when a signal not suppressed by said first or second false alarm inhibiting means is detected, and when said ranging means also determines the presence of a foreign body;

whereby an alarm signal is generated only upon the concurrence of at least two separate means for assuring the presence of a foreign object in said body of water.

11. The method of claim 10, further comprising the steps of:

measuring the amplitude of signals detected by said Doppler detection means;

counting the number of signals detected by said Doppler detection means;

measuring the amplitude of signals detected by said ranging means;

counting the number of signals detected by said ranging means;

generating an alarm signal only upon concurrence of a predetermined combination of signal amplitudes measured by said Doppler detecting means and said ranging means that is repeated a predetermined number of times.

12. The method of claim 11, wherein the predetermined combination of signal amplitudes is X/T for said Doppler detecting means and Y/T for said ranging means, and wherein the predetermined number of times said signals of said amplitudes must be detected to generate an alarm signal is N, where X, Y and T are variables and where N is the number of times a combination is repeated.

* * * * *